United States Patent [19]

Frode

[11] Patent Number: 4,754,777
[45] Date of Patent: Jul. 5, 1988

[54] VALVE FOR THE ADDITION OF WATER TO ELECTROCHEMICAL ACCUMULATOR BATTERIES

[75] Inventor: Enar P. Frode, Oskarshamn, Sweden

[73] Assignee: Sab Nife AB, Landskrona, Sweden

[21] Appl. No.: 44,896

[22] PCT Filed: Aug. 11, 1986

[86] PCT No.: PCT/SE86/00360
§ 371 Date: Apr. 3, 1987
§ 102(e) Date: Apr. 3, 1987

[87] PCT Pub. No.: WO87/01172
PCT Pub. Date: Feb. 26, 1987

[30] Foreign Application Priority Data

Aug. 14, 1985 [SE] Sweden ............................ 8503797

[51] Int. Cl.⁴ .......................................... F16K 31/126
[52] U.S. Cl. .................................... 137/261; 137/454; 137/505.39
[58] Field of Search .......... 137/453, 454, 260, 505.39, 137/261

[56] References Cited

U.S. PATENT DOCUMENTS

| | | | |
|---|---|---|---|
| 2,111,560 | 3/1938 | Fox | 137/505.39 X |
| 2,707,051 | 4/1955 | Mailhot | 137/505.39 X |
| 2,810,776 | 10/1957 | Brill | 137/260 X |
| 4,522,896 | 6/1985 | Iseard | 429/63 |
| 4,527,593 | 7/1985 | Campau | 137/260 X |

FOREIGN PATENT DOCUMENTS

2189671 1/1974 France .
2259445 8/1975 France .
2350700 12/1977 France .

*Primary Examiner*—Alan Cohan
*Attorney, Agent, or Firm*—Laurence R. Brown; Alfred J. Mangels

[57] ABSTRACT

A valve for the addition of water to electrochemical accumulator batteries and for maintaining the flow of liquid at a constant level. A membrane in a valve body is biased by means of a spring against a wall arranged concentrically with an inlet orifice, the wall creating an inner chamber of circular cross-section, and an outer chamber which is of annular cross-section and is connected to an outlet connection via a constricted orifice. A spindle at the center of the membrane passes freely through the inlet orifice and exhibits outside the latter a conically enlarged part, the cross-sectional area of which increases in proportion to the distance to the inlet orifice, serving as a valve seat, and which is intended to provide a seal when the spring yields to the membrane.

9 Claims, 6 Drawing Sheets

VALVE FOR THE ADDITION OF WATER TO ELECTROCHEMICAL ACCUMULATOR BATTERIES

TECHNICAL FIELD

The present invention relates to a valve for the addition of water to electrochemical accumulator batteries comprising a valve body provided with an inlet connection to the valve body and an outlet connection. A valve of this kind is intended to constitute part of an arrangement comprising level-controlling devices for each cell in a battery for the supply of water to the cell up to a predetermined maximum level, said devices being connected to a line for the supply of water and for the ventilation of the gas spaces of the cells, wherein one end of the line is connected to a valve in accordance with the invention for the purpose of controlling the supply of water and the other end of the line provides ventilation to the atmosphere via a riser pipe.

TECHNICAL BACKGROUND

A number of different arrangements for the addition of water to electrochemical accumulator batteries are already known. A common feature of these is that each cell has devices which permit the supply of water to a predetermined maximum level. The function of these devices can be based on ghe hydrostatic effect or on floats in different variants. The devices are attached in series or parallel connection to a storage container for water.

The systems differ primarily with regard to the arrangement of the supply of water to the level-controlling devices. This object may appear trival, although in practice it has proved difficult to resolve with regard to the requirement for flexibility of the design and low cost. A suitable system should, in fact, be capable of being applied to:

batteries with cells positioned in groups on different planes, such as in a stepped frame, on shelves positioned vertically beneath one another, or on an inclined plane, such as a floor which slopes towards a floor drainage channel;

battery installations in a concealed or not easily accessible position, such as in railway wagons and diesel locomotives, etc.;

batteries whose cell enclosures can exhibit considerable differences in respect of their material, construction and thus even their sensitiveness to pressure, for which reason the applied positive or negative pressure should be small, so that the capacity of the container is not affected to any significant degree or the risk of fracture is eliminated; consequently, any series of level-controlling devices connected together via an inlet supply line should be short, having regard to the unavoidable drop in pressure in the line, since the filling time would otherwise be unacceptably long;

batteries ranging in size from only a few cells up to several hundred cells; it is necessary in the case of the larger batteries, in view of the risk of leakage currents, for these to be divided up into an appropriate number of cell groups, to which the water supply is provided via separate lines.

Previously disclosed in GB No. 1 142 633 is a filling system which makes use of a storage container positioned beneath the outlet level of the level-controlling devices installed in the cells. The water is conveyed from the storage container by means of a pump either directly to the level-controlling devices or indirectly to these via a reservoir positioned at a higher level with a gravity feed to the cells. Any surplus water is returned by gravity to the storage container positioned at a lower level. The arrangement requires the availability of a mains electricty supply and is unsuitable for multi-cell batteries, for which a number of separate water supply branches are necessary.

A similar arrangement is disclosed in GB No. 2 041 629, which differs from the arrangement described above essentially in that water from a storage container is sucked into the level-controlling devices by means of a pump attached to the storage container.

This system suffers from the same disadvantages as the system disclosed in GB No. 1 142 633. Furthermore, negative pressure can be created which may damage the cells. By introducing a filling container in series between the storage container and the cells at a height such that the fluid levels in the filling container and the cells are essentially identical, it is possible to avoid harmful negative pressure, as may be appreciated from SE No. 7910526-8. This arrangement makes use of a central reserve of battery fluid, from which a pump conveys fluid to the aforementioned filling container on the cells. The fluid is sucked from here to the cells by the level-controlling devices, and any surplus is returned to the storage container. This complicated arrangement is suitable only for the filling of batteries with relatively few cells positioned on the same plane.

Contrastingly simple is an arrangement described in DE No. 23 03 244, in which cells with level-controlling devices are supplied with water by gravity from a storage containerpositioned above the electrolyte level of the cells. In spite of its simplicity this principle is not applicable to multi-cell batteries, in which the necessary level vessels would result in an installation which is difficult to monitor and onerous to maintain.

Previously disclosed systems, such as those mentioned above, may be well suited to certain applications, although they lack the necessary flexibility for them to be able to satisfy the fluctuating demands which may be placed on a filling arrangement in accordance with the above list of demands, the purpose of which is to achieve reduced maintenance costs through lower servicing requirements and/or rapid servicing of the battery installations, yet retaining high operational reliability in conjunction with a low cost for the arrangement and the installation.

THE INVENTION

This problem is solved through the present invention by means of a valve for controlling the supply of water, which is characterized in that a membrane sealingly arranged in the valve body is biased by means of a spring against a wall arranged inside the valve body concentrically with the inlet orifice, said wall dividing a space created by the membrane and the valve body into an inner chamber of circular cross-section towards the membrane and is connected to the outlet connection via a constricted orifice, wherein the membrane is provided at its centre with a spindle which passes freely through the inlet opening, in this way reduced to an annular slot, and which outside the inlet orifice has a conically enlarged part, the cross-section area of which increases in proportion to the distance to the inlet orifice and which is intended to provide a seal when the spring yields to the membrane.

This valve can, as has already been mentioned, form part of an arrangement for the filling of water into electrochemical accumulator batteries containing level-controlling devices which permit the addition of water to each cell in a battery up to a predetermined maximum level, said devices being connected to a line for the supply of water and for the ventilation of the gas spaces of the cells, wherein one end of the line is attached to a valve in accordance with the invention for the purpose of controlling the supply of water and the other end of the line provides ventilation to the atmosphere via a riser pipe. In an arrangement of this kind the valve should be positioned in close proximity to a level-controlling device.

A storage container for water can, according to one embodiment, be positioned at a sufficient height above the valve for its opening pressure to be exceeded by the head of water.

Alternatively a pump, preferably a centrifugal pump, can convey water from a storage container to the valve at a pressure which exceeds the opening pressure of the valve.

The riser pipe preferably discharges into an explosion-suppressing valve.

The cells can be arranged on one and the same plane or on different planes, such as in a stepped frame.

In an embodiment, which is particularly suitable for multi-cell batteries, the cells can be connected together in series in groups via the level-controlling devices to a line for the supply of water and for the ventilation of the cells, wherein each line is connected at one end in close proximity to a valve for regulating the supply of water and at the other end to a riser pipe.

Each group of cells which is connected to a supply line may appropriately consist of 1–30 cells. The valves may appropriately be attached in parallel to a storage container for water.

The expression 'water' shall also be understood to denote any other battery fluid.

BRIEF DESCRIPTION OF THE DRAWINGS

The invention is now described in greater detail with reference to the accompanying drawings, in which.

DESCRIPTION OF THE PREFERRED EMBODIMENTS

The reference numeral 10 is used in the Figures to denote a valve according to the invention for the addition of water to electrochemical accumulator batteries. The valve consists of a valve body 12 of circular cross-section with an inlet connection 14 having a circular orifice 16 facing towards the valve body, serving as a valve seat, and with an outlet connection 18 with a constricted orifice 20 facing towards the valve body.

A cover 22 secured to the valve body by means of screws 23 sealingly connects a membrane 24 to the valve body but has opening 25 to the surrounding atmosphere. A spring 26 supported against the cover 22 biases the membrane 24 against an annular seat defined by a wall 28 arranged concentrically with the inlet orifice 16 inside the valve body, said wall dividing the space inside the valve body into an inner chamber 30 and an outer chamber 32, the inner exhibiting annular cross-section towards the membrane. At the centre of the membrane is a valve spindle 34 passing freely through the inlet orifice 16, which in this way is reduced to an annular slot. Outside the inlet orifice 16 the spindle has a conical part 36, the cross-sectional area of which increases with the distance from the valve seat 16 and which is intended to provide not only a change in the area of the slot, but also a seal when the spring 26 yields to the membrane 24. The membrane 24 can appropriately be moulded from rubber, for example EPDM rubber, as an integral unit together with the spindle 34 and the conical part 36. The membrane and the spindle may, however, constitute separate components which are joined together in an appropriate fashion. Only the annular part of the membrane in the outer chamber 32 needs to be elastic to any significant degree. The spring 26 can appropriately consist of stainless spring steel, whilst the valve body 12 and the cover 22 may appropriately be injection moulded in a plastics material such as propylene.

The valve has three different functions, which are achieved with only one signle moving part. The valve has a distinct opening pressure, that is to say the fluid pressure in the inlet pipe must exceed a predetermined value before the valve will open to permit a flow to pass through. Once this condition has been met, fluid will flow through the valve, which will then maintain the rate of flow at a constant level. The third function takes effect when a counter-pressure occurs in the outlet pipe, in which case the flow rate is reduced and the valve closes fully at a certain counter-pressure.

These functions are vital if controlled conditions are to be provided for the addition of water to electrochemical accumulators; it is hereby important:

that the flow of water to the cells is adjusted in such a way that it will permit a certain promptness and continuity during the filling operation, but that it will not exceed a certain, predetermined threshold value above which the simultaneous ventilation of the gas space in the cells is rendered difficult or is prevented;

that the pressure of the water supply to the cells remains unaffected by the water pressure acting against the valve and is adjusted in such a way that harmful over-pressure cannot arise in the cells;

that the valve has a minimum opening pressure for the flow to the cells, mainly in order to prevent the passage of gas from the cells via the valve; and that the flow through the valve ceases at a certain counterpressure.

Figure 1:
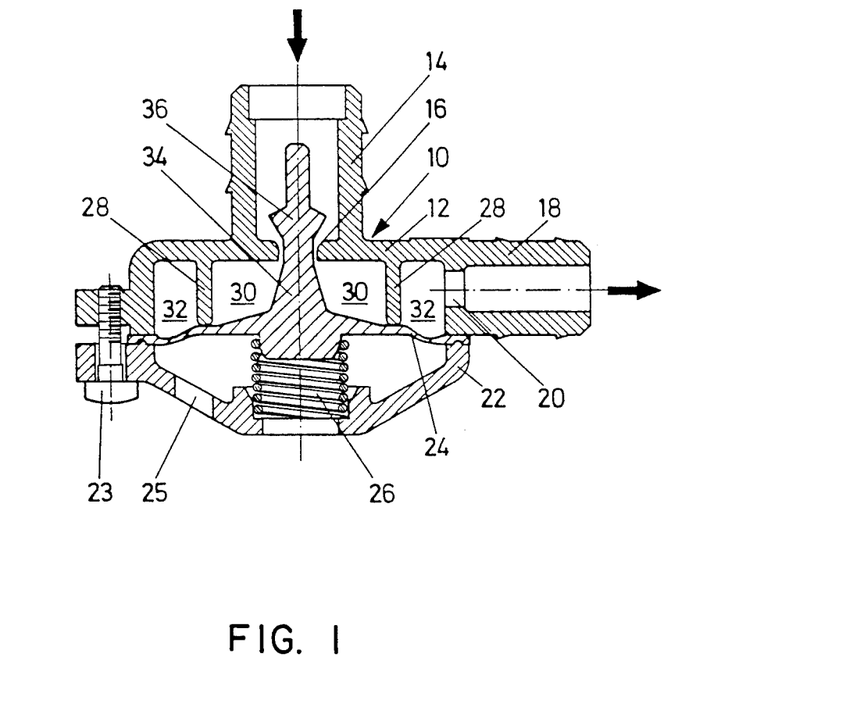
FIG. 1 shows an example of a valve according to the invention in cross section.
Figure 2A:
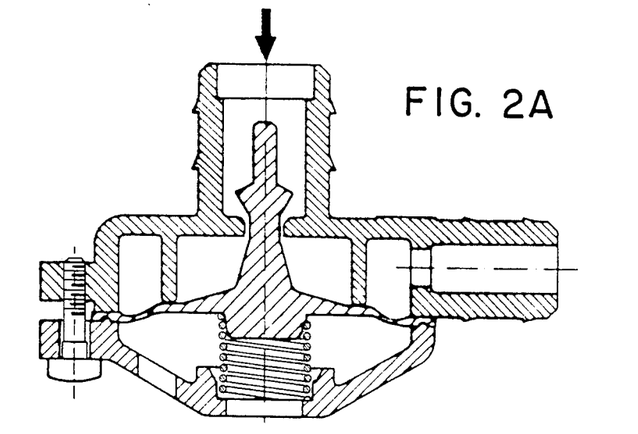
FIGS. 2A, B, and C illustrate the mode of operation of the valve in three different valve positions.
Figure 2B:
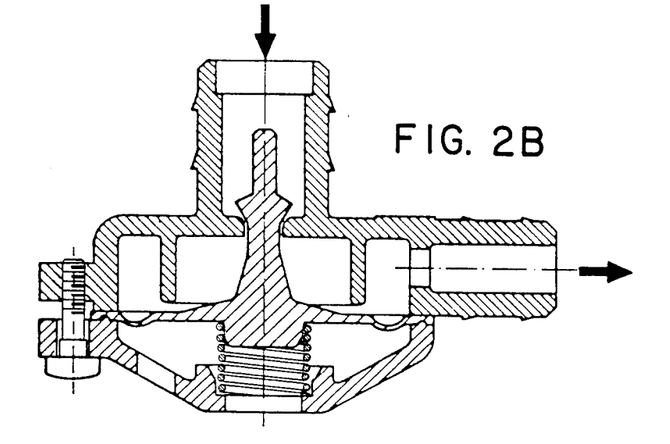
Figure 2C:
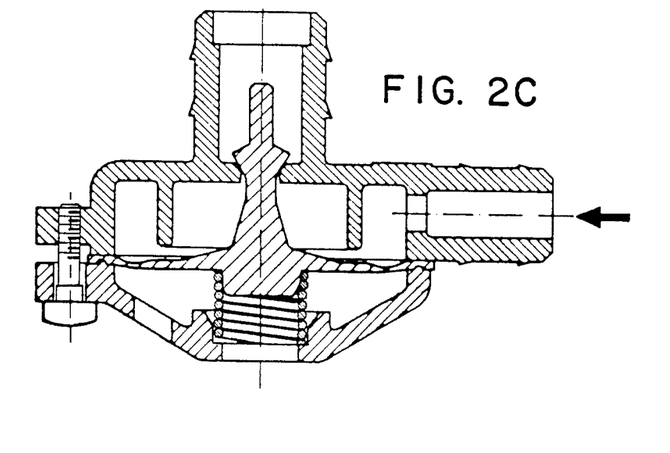

The functions of the valve are illustrated as positions A, B and C in FIG. 2, from which the reference designations have been omitted for the sake of clarity. In FIG. 2 A the membrane 24 is resting against the wall 28. The inlet via 14 is open towards the inner chamber 30, but the outlet via the outer chamber 32 and the connection 18 is closed. This condition will continue to exist for as long as the inlet pressure on the surface of the membrane in the inner chamber 30 is below a minimum value balanced by the spring force.

If this value is exceeded, the spring 26 will yield to the membrane 24 and will open to the outer valve chamber 32 and thus to the outlet 18. The valve will then be in the FIG. 2B position. The incoming water, the pressure of which has just caused the spring to yield to the membrane, will at the same time also be allowed to enter the outer valve chamber, in which case it will act on the exposed surface of the entire membrane facing towards the chambers. The spring is then operating against a proportionally greater force, which widens the opening between the membrane and the chambers so as to permit a stable flow. In this way the valve is insured a distinct opening for a flow through same.

The flow through the valve in FIG. 2B is continuous and constant, provided that the counter-pressure on the outlet side is comparatively low and is also constant. The flow reduces, however, as the counter-pressure increases and comes to a complete halt at a certain predetermined value. This condition is represented in FIG. 2C. The spring in this case has yielded further to the membrane, so that the conical part 36 on the spindle 34 seals against the valve seat 16.

The dimensioning of the spring 26, which regulates the movements of the membrane 24 and also the opening and closing of the inlet orifice, determines the operating pressure of the valve, that is to say the minimum pressure for opening towards the outer valve chamber and the pressure for closing the inlet 16. The desired flow is determined by the appropriate selection of surface areas for the inlet slot between the inlet 16 and the conical part 36 of the spindle and for the outlet orifice, i.e. the constriction 20. Adjustable calibration of the spring 26 can, of course, be achieved, if this is considered to be advantageous, by means of an adjustable attachment in the cover 22.

In the case of a continuous flow the membrane will alternatively increase and reduce the inlet slot, that is to say it will alternate between the positions of FIG. 2B and FIG. 2C, whilst maintaining the predetermined operating pressure and thus the predetermined flow rate through the outlet orifice. The flow through the valve is unaffected by variations in the pressure on the feed side, provided that it is above the minimum pressure for opening the valve.

Generally speaking, this valve provides a constant flow regulation for a liquid.

The various functions of the valve make it particularly well suited for use as a device for regulating the supply of water to arrangements for the addition of water to electrochemical accumulator batteries. Examples of such arrangements are shown in FIGS. 3-6. Each such arrangement contains level-controlling devices 38, which permit the supply of water to each cell 40 in a battery 42 up to a predetermined maximum level 44. The levelcontrolling devices 38 are connected to a line 46 for the supply of water and for the ventilation of the gas spaces of the cells. A valve 10 in accordance with the invention is attached to one end 48 of the line 46 in close proximity to a level-controlling device. The other end 50 of the line 46 is connected to a riser pipe 52 for ventilation to the atmosphere.

Figures 3, 4:
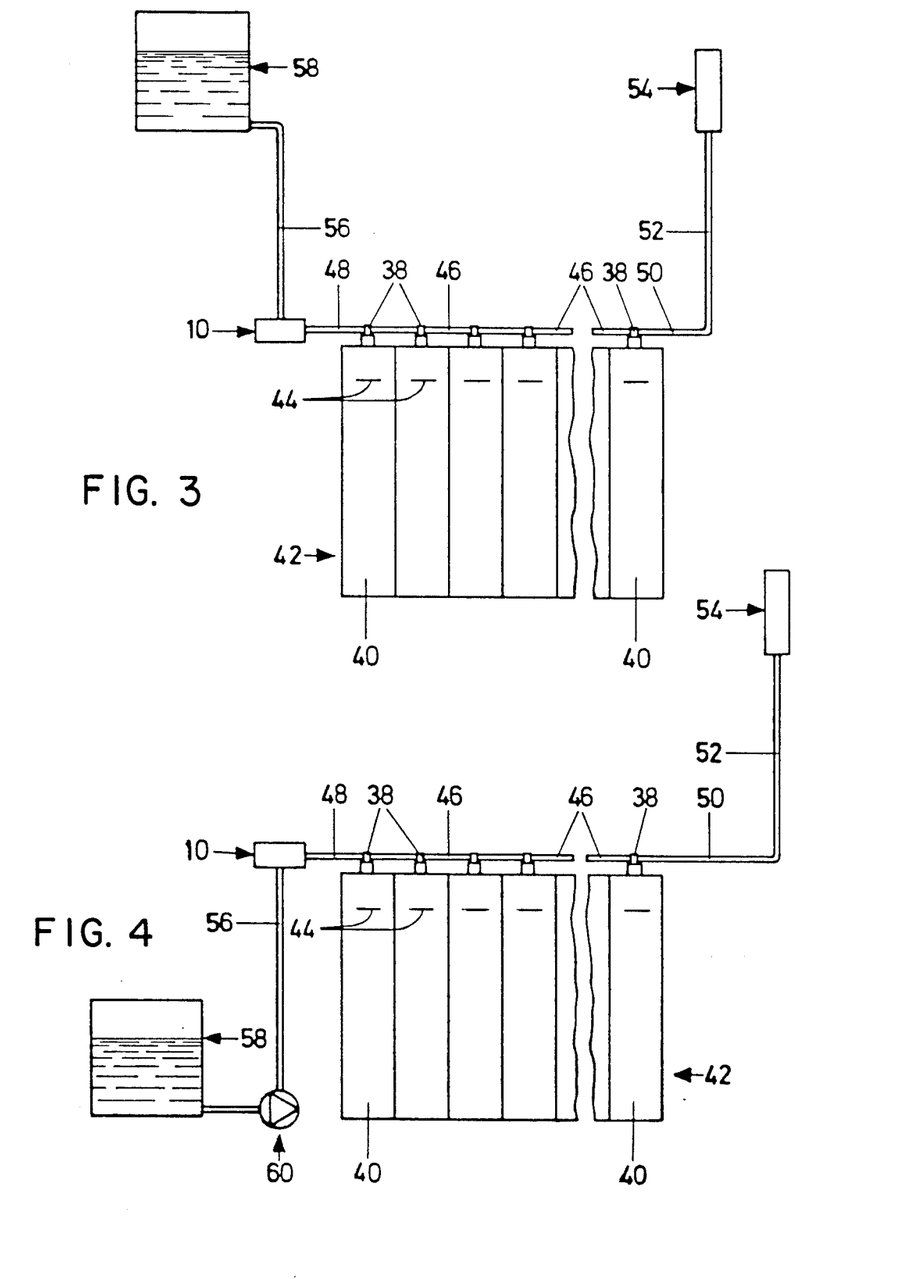
FIGS. 3–6 schematically show different arrangements for the addition of water according to the invention.

In one embodiment, shown in FIG. 3, the valve 10 is connected via a line 56 to a storage container 58 for water positioned at a sufficient height above the valve for its opening pressure to be exceeded by the head of water. The riser pipe 52 discharges preferably into an explosion-suppressing valve 54.

Figure 5:
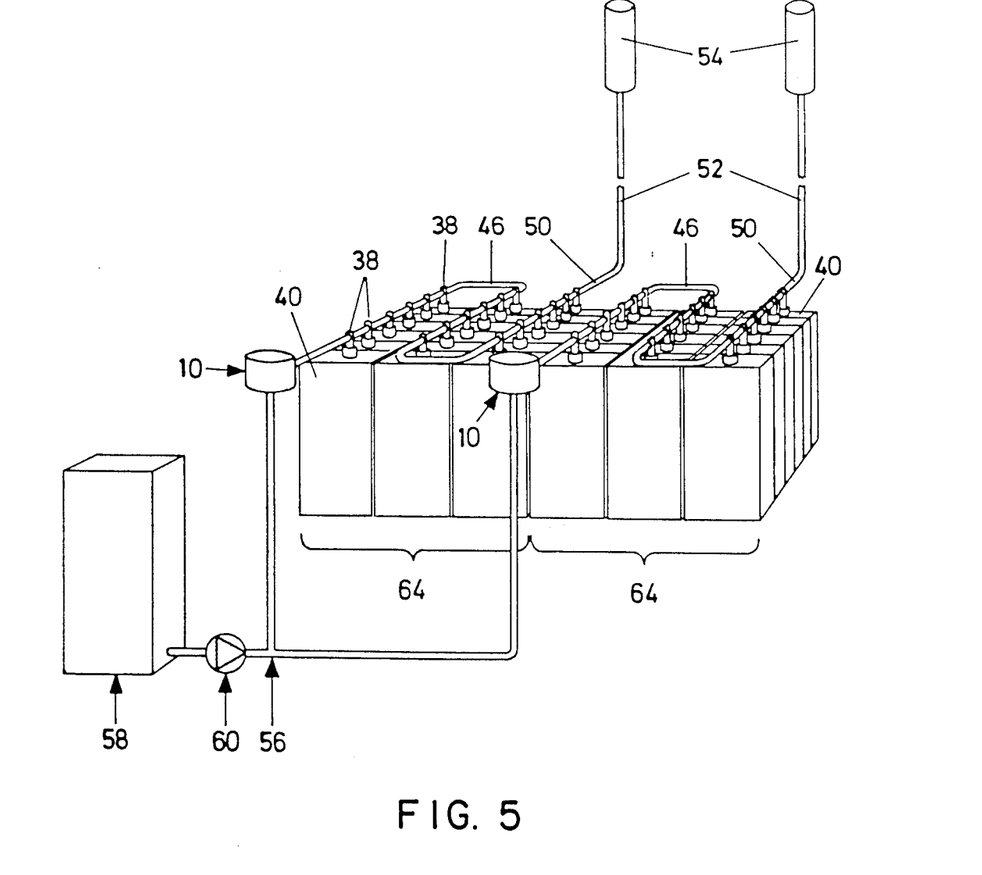
Figure 6:
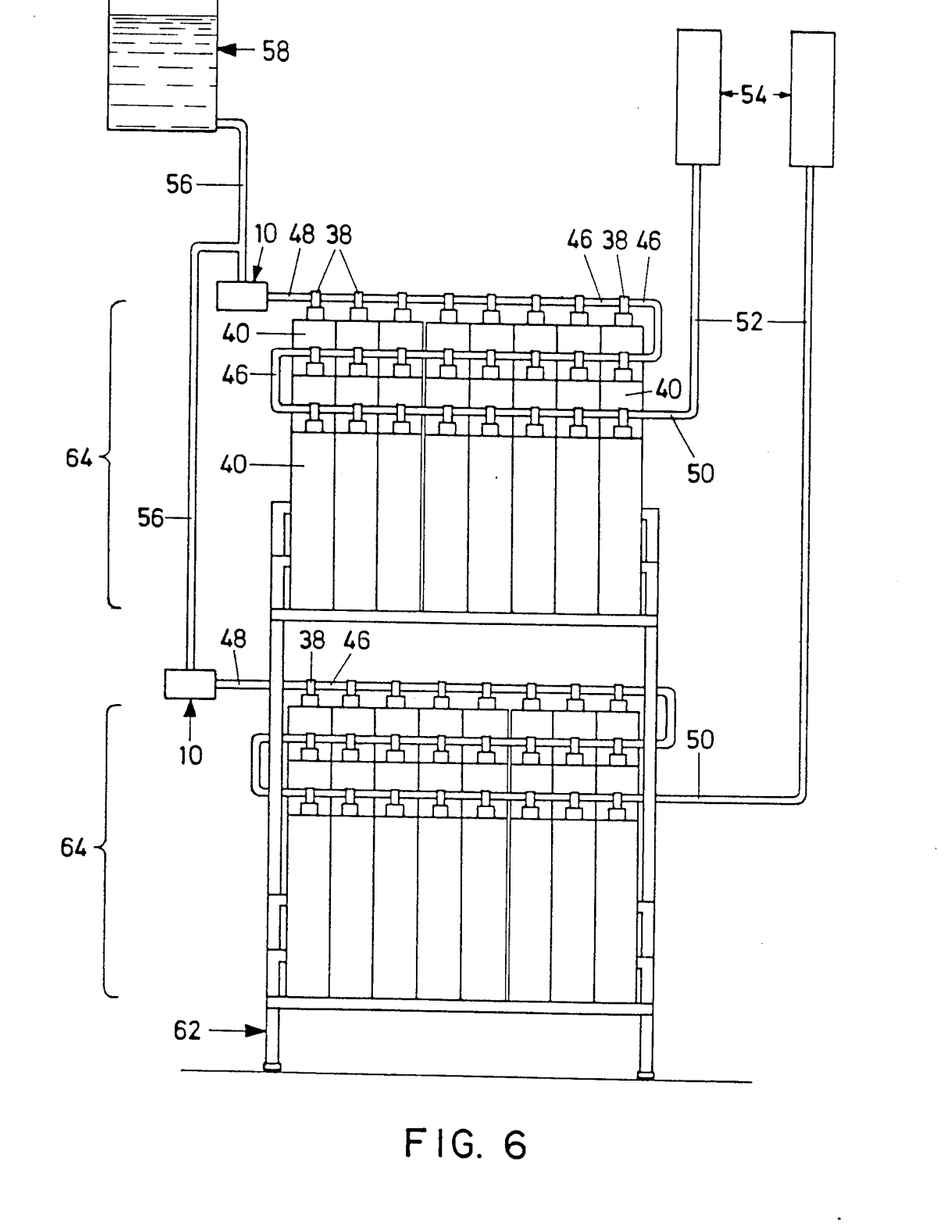

The storage container 58 for water can also be positioned low in relation to the cells, in which case a pump 60—preferably a centrifugal pump—forces water through the line 56 to the valve 10; see FIG. 4. The cells can be arranged, as desired, either on one and the same plane, as shown in FIGS. 3-5, or on different planes, such as in a stepped frame 62, as shown in FIG. 6.

Figure 7:
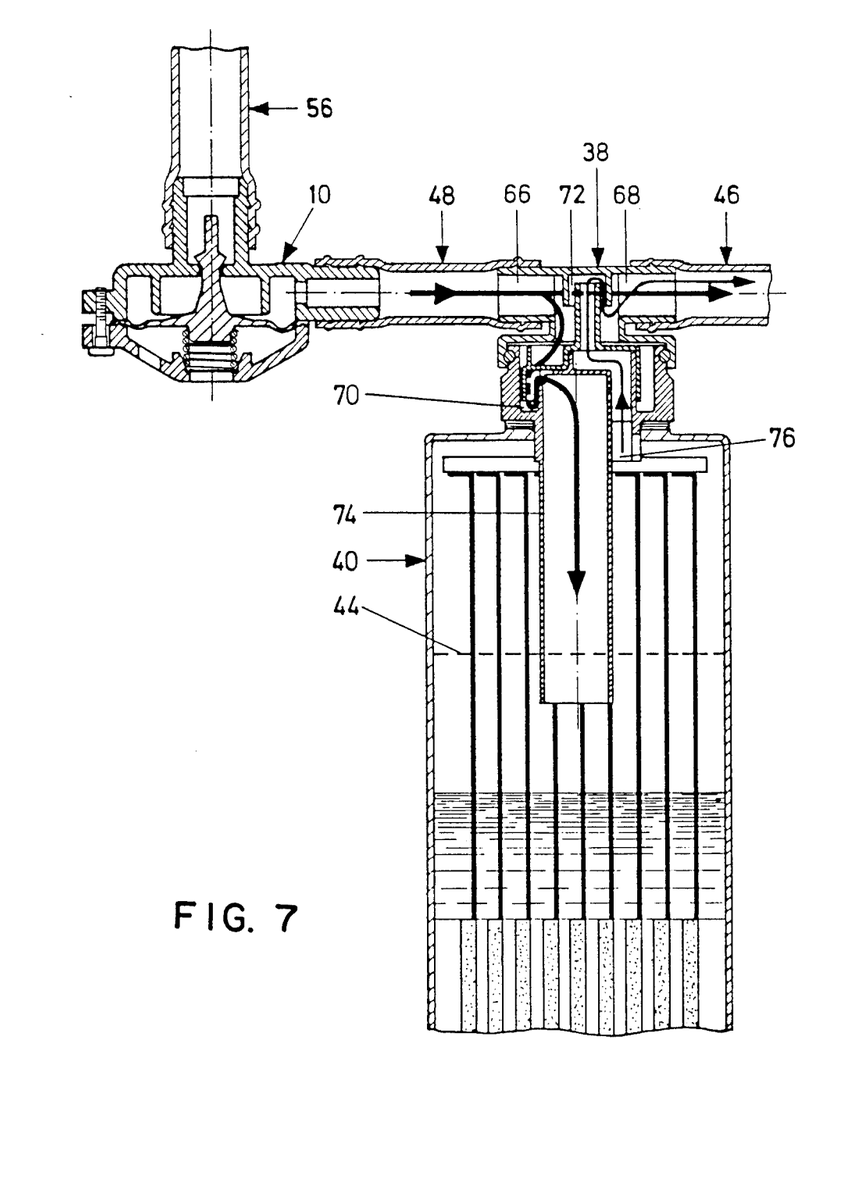
FIG. 7 in a vertical section shows a valve according to the invention connected to a level-controlling device in an electrochemical cell.

The function of the level-controlling devices 38 can be illustrated with the help of FIG. 7. This provides a detailed picture of a membrane valve 10 in accordance with the invention, which is connected via the end 48 of the line in close proximity to a level-controlling device 38 in the first of several cells 40 included in a battery 42, for example as shown in FIG. 3.

As mentioned by way of introduction, various types of level-controlling devices have been disclosed. The choice of any of them is of no consequence for the function of a water addition arrangement in accordance with the invention. The device 38 shown in FIG. 7 exhibits hose connections 66 and 68, respectively, for the inlet and the outlet of the water flow, which is led to the cell 40 from a storage container 58 (not shown here) through the line 56 and via the valve 10, the line 48 and the connection 66, and is then conveyed to the next cell through the connection 68 and the line 46.

The level-controlling device 38 has a lower and an upper water trap 70 and 72 respectively. The water flow in the device 38 follows the path indicated by a thick arrow, via a column 74 to the electrolyte space of the cell, at the same time as air battery gases are evacuated via a channel 76 along the path indicated by a thin arrow. The water flow to the cell ceases when the electrolyte level has risen to the indicated maximum level 44, in which case the lower opening of the column 74 has been closed off by the electrolyte of the cell and a pressure equivalent to the pressure level determined by the valve 10 at the water trap 70 has been built up inside the column 74.

The water flow from the valve 10 may preferably be so adjusted that only a few cells, perhaps one quarter to one half of the cells are filled simultaneously in a series supplied from the same valve. The first cell in the direction of the flow takes a greater proportion of the flow than the following cells and is thus filled most quickly, and the immediately following cells are filled progressively more slowly. Once the first cell is full, the immediately following cells will have a greater proportion of the flow to distribute, and filling continues in this way until the last cell in the series has been filled. The water is then conveyed further, see FIG. 3, to the riser pipe 52 via the line 50, where it rises to a height corresponding to the counterpressure necessary for the valve 10 to close off the flow of water.

By regulating the flow in the manner indicated, abundant space is provided for conducting away air and battery gases from the cells, which is important if the desired level of filling in the cells is to be reliably achieved. The valve 10 should be connected close to and approximately on a level with the first level-controlling device 38 in a series, as may be appreciated from FIG. 7, so that the predetermined operating conditions for the valve, which are not subsequently adjustable, can be utilized to the full extent. The valve thus ensures that the desired flow and pressure conditions are maintained in the filling arrangement, irrespective of the positioning of the water storage container, and it ensures that the battery gases are always led away from the installation via the riser pipe, possibly through an explosion-suppressing valve 54 installed thereon.

The valve 10 also prevents the water line 56 leading from the storage container 58 from being emptied of water at the closure of the valve when a container installed in a low position is used; see FIG. 4. Disturbances in the function of the level-controlling devices 38, of which there is a risk if airlocks are formed in the line 56 and are introduced into the line 46 on opening the valve, can be avoided in this way.

According to a further embodiment of the invention the cells 40 are connected in series through level-controlling devices 38 in groups 64 with a line 46 for each group, in which case each line 46 is attached at one end 48 in close proximity to a valve 10 for regulating the water supply and is attached at its other end 50 to a riser pipe 52. This embodiment is represented schematically in FIGS. 5 and 6.

This embodiment is applicable in particular in the case of batteries with a large number of cells in order to ensure the desired rate of filling. Each series should not normally, therefore, consist of more than about 30 cells. The number is dependent, however, on the size of the cells, the desired rate of filling and the relative positioning of the cells, etc. Individual cells positioned on planes one beneath the other may thus each require its own valve in order to function reliably. It is acordingly reasonable to set the limit for a group at between 1 and about 30 cells.

Each valve 10 is attached to a storage container 58 for water, preferably through parallel connection on a supply line 56.

INDUSTRIAL APPLICATION

The invention offers a highly flexible, yet very cheap system for the addition of water to electrochemical accumulator batteries applicable to all power sources which call for the addition of water, irrespective of the size, the number or the relative positions of the constituent cells, and irrespective of whether or not a mains power supply is available. The system incorporates a controlled gas release facility and an otherwise sealed water system. It is also robust and well suited to both stationary and traction applications.

I claim:

1. Apparatus for the addition of water to electrochemical accumulator batteries, said apparatus comprising: a plurality of battery cells; level-controlling means for each cell for regulating the addition of water to the cell up to a predetermined maximum level, said level controlling means connected to a supply line for the supply of water and for ventilation of gas from spaces in the cells; valve means connected with the supply line adjacent one end of the line for controlling the supply of water, said valve means arranged in close proximity with one of said level controlling means, said valve means including a valve body, an inlet connection extending from said valve body and including an inlet orifice communicating with the interior of the valve body, an outlet connection extending from said valve body and communicating with the interior of the valve body, a wall within the valve body positioned substantially concentrically with the inlet orifice, a membrane within the valve body, spring means for biasing said membrane against said wall, said wall dividing a space defined between the membrane and the valve body into an inner chamber of circular cross-section and an outer chamber of annular cross-section, said space communicating with the outlet connection through a constricted orifice, a spindle substantially centrally positioned on the membrane, said spindle passing freely through the inlet orifice to define an annular slot therewith, said spindle including a conically enlarged portion which extends outside the inlet orifice and has a cross-sectional area which increases in proportion to the distance from the inlet orifice and which closes the inlet orifice when fluid pressure acting on the membrane compresses the spring means; and a riser pipe connected to the other end of the water supply line.

2. Apparatus in accordance with claim 1, including storage container means for water connected with the supply line, said storage container means positioned at a sufficient height above the valve means for providing a head of water sufficient to overcome the force of the spring means and thereby provide an opening pressure for said valve means.

3. Apparatus in accordance with claim 1, including pump means in communication with the supply line for moving water from a storage container at a pressure that exceeds the force of the spring means and thereby provide an opening pressure for said valve means.

4. Apparatus in accordance with claim 1, wherein the riser pipe discharges into an explosion-suppressing valve.

5. Apparatus in accordance with claim 1, wherein the cells are arranged on a single plane.

6. Apparatus in accordance with claim 1, wherein the cells are arranged on different planes.

7. Apparatus in accordance with claim 1, wherein the cells are connected in series in groups through the level-controlling means to a supply line for each group of cells for the supply of water and for the ventilation of the cells, and to the valve means for regulating the supply of water, each supply line connected at one end to said valve means and at the other end to a riser pipe.

8. Apparatus in accordance with claim 7, wherein each group of cells connected to a supply line includes from 1 to about 30 cells.

9. Apparatus in accordance with claim 7, wherein the valve means includes plural valves that are connected in parallel with storage container means for containing water.

* * * * *